(12) United States Patent (10) Patent No.: US 12,694,403 B2
Kato                                          (45) Date of Patent:       Jul. 28, 2026

(54) TOLL PAYMENT APPARATUS FOR VEHICLE

(71) Applicant: SUBARU CORPORATION, Tokyo (JP)

(72) Inventor: Hideaki Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/527,662

(22) Filed: Dec. 4, 2023

(65) Prior Publication Data

US 2024/0202726 A1       Jun. 20, 2024

(30) Foreign Application Priority Data

Dec. 16, 2022    (JP) ................................. 2022-201158

(51) Int. Cl.
G06Q 20/40                (2012.01)

(52) U.S. Cl.
CPC ... G06Q 20/40145 (2013.01); G06Q 20/4015 (2020.05); G06Q 2240/00 (2013.01)

(58) Field of Classification Search
CPC ...... G06Q 50/40; G06Q 20/322; G06Q 20/32; G06Q 20/34; G06Q 20/36; G06Q 30/0206
See application file for complete search history.

(56) References Cited

U.S. PATENT DOCUMENTS

2010/0280956 A1* 11/2010 Chutorash ............. G07F 13/025
                                                              705/64
2019/0263424 A1*  8/2019 Penilla .................. H04L 63/107

2020/0311716 A1* 10/2020 Ravi .................... G06Q 20/325
2020/0380518 A1* 12/2020 Honeycutt ......... G06Q 10/1095
2022/0131859 A1*  4/2022 Harvey ................. H04W 12/75
2023/0376967 A1* 11/2023 Jeong ................. G06Q 20/3223

FOREIGN PATENT DOCUMENTS

JP          2008-181197 A       8/2008

OTHER PUBLICATIONS

M. R. Komanecky and D. M. Claus, "IVHS applications of smart cards," Vehicle Navigation and Information Systems Conference, 1991, Troy, MI, USA, 1991, pp. 977-987, doi: 10.1109/VNIS.1991. 205843 (Year: 1991).*

* cited by examiner

*Primary Examiner* — Michael P Harrington
(74) *Attorney, Agent, or Firm* — TROUTMAN PEPPER LOCKE LLP

(57)                ABSTRACT

A toll payment apparatus for a vehicle includes a synchronizer, an occupant data obtainer, and a vehicle processor. The synchronizer is configured to synchronize with a communicator of an occupant of the vehicle and acquire, from the communicator of the occupant, payment data of the occupant and identification data of the occupant. The occupant data obtainer is configured to acquire occupant data from the occupant. The vehicle processor is configured to perform a comparison between the identification data and the occupant data when the synchronizer synchronizes with the communicator of the occupant after a start up of the vehicle, and validate a payment that is based on the payment data when the vehicle processor determines that the occupant is a person identified by the payment data.

3 Claims, 3 Drawing Sheets

TOLL PAYMENT APPARATUS FOR VEHICLE

CROSS-REFERENCE TO RELATED APPLICATION

The present application claims priority from Japanese Patent Application No. 2022-201158 filed on Dec. 16, 2022, the entire contents of which are hereby incorporated by reference.

BACKGROUND

The disclosure relates to a toll payment apparatus for a vehicle.

An electronic toll collection (ETC) system has been introduced in many roads in recent years. In the ETC system, a communication is performed between a roadside device installed at a facility such as a tollgate and an in-vehicle device of a vehicle, and a toll payment of a toll road is processed without stopping the vehicle. An occupant of the vehicle inserts an ETC card into the in-vehicle device in advance, and a toll is charged through a credit card company at a later date.

For example, Japanese Unexamined Patent Application Publication (JP-A) No. 2008-181197 discloses an ETC system that uses an ETC adaptor card instead of the ETC card. The ETC adaptor card communicates with a mobile terminal of an occupant of a vehicle after being inserted into an ETC in-vehicle device of the vehicle. The ETC in-vehicle device communicates with a roadside device by using ETC data of the occupant held in the ETC adaptor card, and pays a toll based on a credit functionality of the mobile terminal.

SUMMARY

An aspect of the disclosure provides a toll payment apparatus for a vehicle. The toll payment apparatus includes a synchronizer, an occupant data obtainer, and a vehicle processor. The synchronizer is configured to synchronize with a communicator of an occupant of the vehicle and acquire, from the communicator of the occupant, payment data of the occupant and identification data of the occupant. The occupant data obtainer is configured to acquire occupant data from the occupant. The vehicle processor is configured to perform a comparison between the identification data and the occupant data and determine whether the occupant is a person identified by the payment data. The vehicle processor is configured to perform the comparison between the identification data and the occupant data when the synchronizer synchronizes with the communicator of the occupant after a start up of the vehicle, and validate a payment that is based on the payment data when the vehicle processor determines that the occupant is the person identified by the payment data.

An aspect of the disclosure provides a toll payment apparatus for a vehicle. The toll payment apparatus includes circuitry, an occupant data obtainer, and a vehicle processor. The circuitry is configured to synchronize with a communicator of an occupant of the vehicle and acquire, from the communicator of the occupant, payment data of the occupant and identification data of the occupant. The occupant data obtainer is configured to acquire occupant data from the occupant. The vehicle processor is configured to perform a comparison between the identification data and the occupant data and determine whether the occupant is a person identified by the payment data. The vehicle processor is configured to perform the comparison between the identification data and the occupant data when the circuitry synchronizes with the communicator of the occupant after a start up of the vehicle, and validate a payment that is based on the payment data when the vehicle processor determines that the occupant is the person identified by the payment data.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
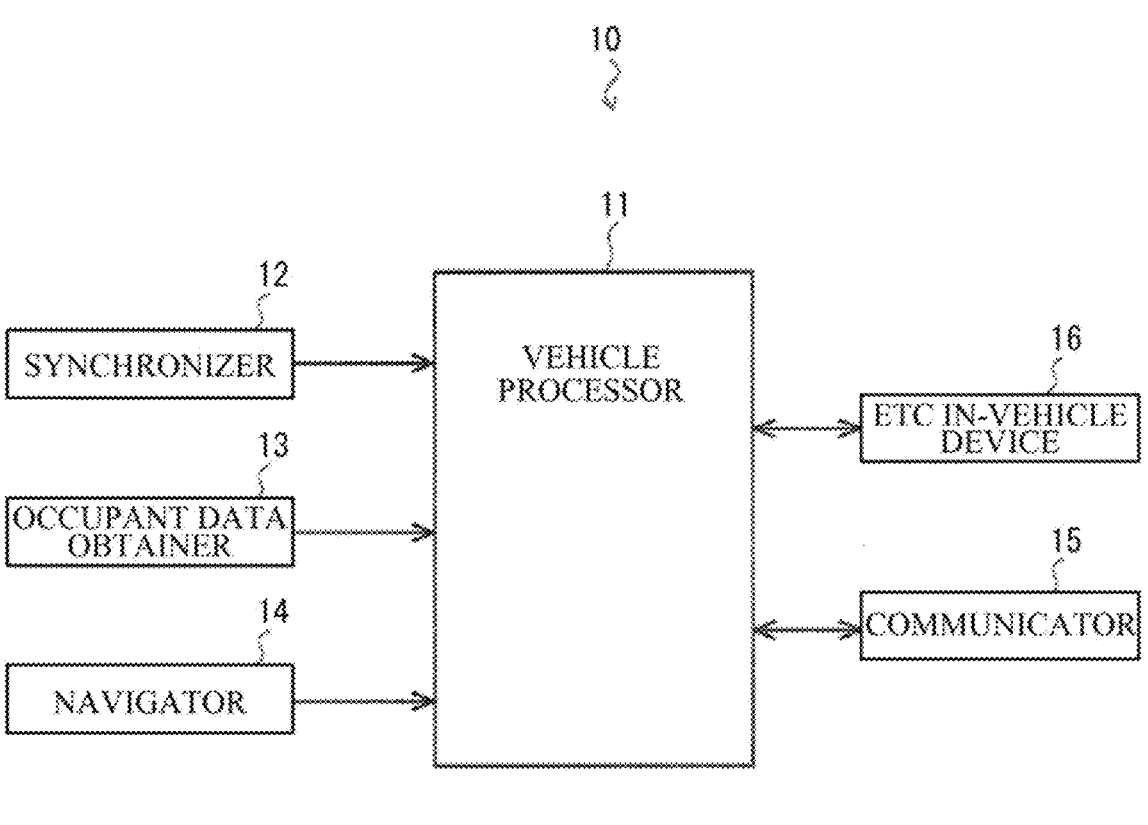
FIG. 1 is a block diagram illustrating a toll payment apparatus for a vehicle according to one example embodiment of the disclosure.

An ETC system that uses an ETC card for an in-vehicle device necessitates a driver who drives a vehicle to insert the ETC card into the in-vehicle device every time the driver uses a toll road, which can be troublesome for the driver. Further, a gate of a roadside device of the toll road does not open when the driver forgets to insert the ETC card into the in-vehicle device and attempts to pass through the gate, which can cause inconvenience to a subsequent vehicle.

In recent years, car-sharing in which a single vehicle is shared by multiple drivers has become popular. When one of the drivers forgets to remove the ETC card at the time of getting out of the vehicle, it is then possible for another one of the drivers using the vehicle to illicitly use the ETC card remaining in the in-vehicle device. In this case, a toll derived from use of a toll road can be charged to the driver who has not actually used the toll road.

An ETC system using an ETC adapter card, such as that disclosed in JP-A No. 2008-181197, deletes ETC data held in the ETC adapter card after ignition-off of a vehicle. However, the ETC system using the ETC adapter card does not perform an identity confirmation between a mobile terminal and a driver who drives the vehicle when the ETC adapter card acquires the ETC data from a mobile terminal after ignition-on of the vehicle. Accordingly, when an occupant of the vehicle uses a mobile terminal of another person, a toll derived from use of a toll road can be charged to the other person who has not actually used the toll road.

It is desirable to provide a toll payment apparatus for a vehicle that makes it possible to prevent an illicit use.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Hereinafter, a toll payment apparatus for a vehicle 10 (hereinafter simply referred to as the "toll payment apparatus 10") according to an example embodiment of the disclosure will be described in detail with reference to the drawings. In the description of the example embodiment, the same reference numerals are basically used for the same components, and repetitive description thereof will be omitted.

Figure 2:
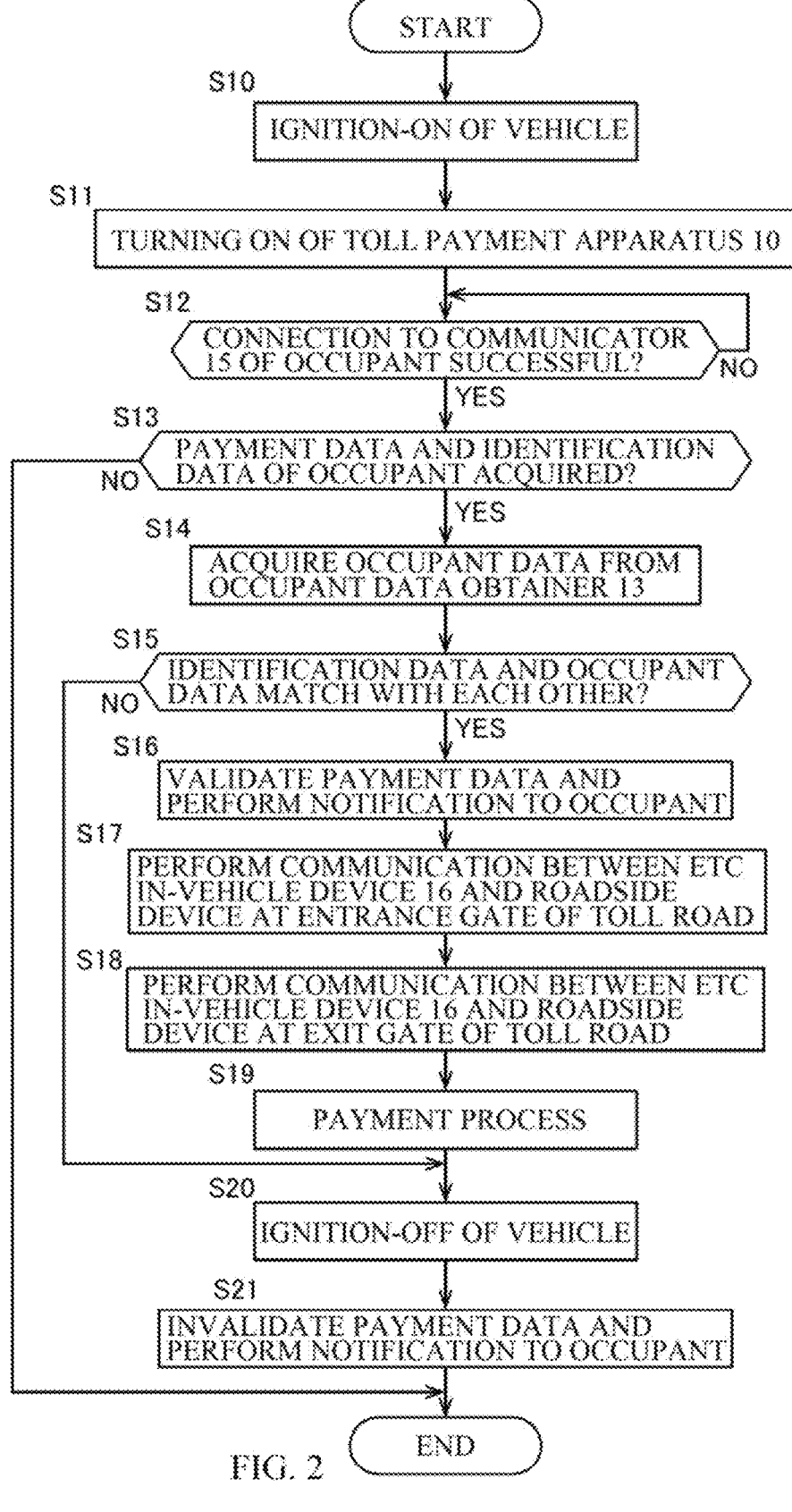
FIG. 2 is a flowchart illustrating a method of controlling a cashless payment to be performed by the toll payment apparatus for the vehicle illustrated in FIG. 1.
Figure 3:
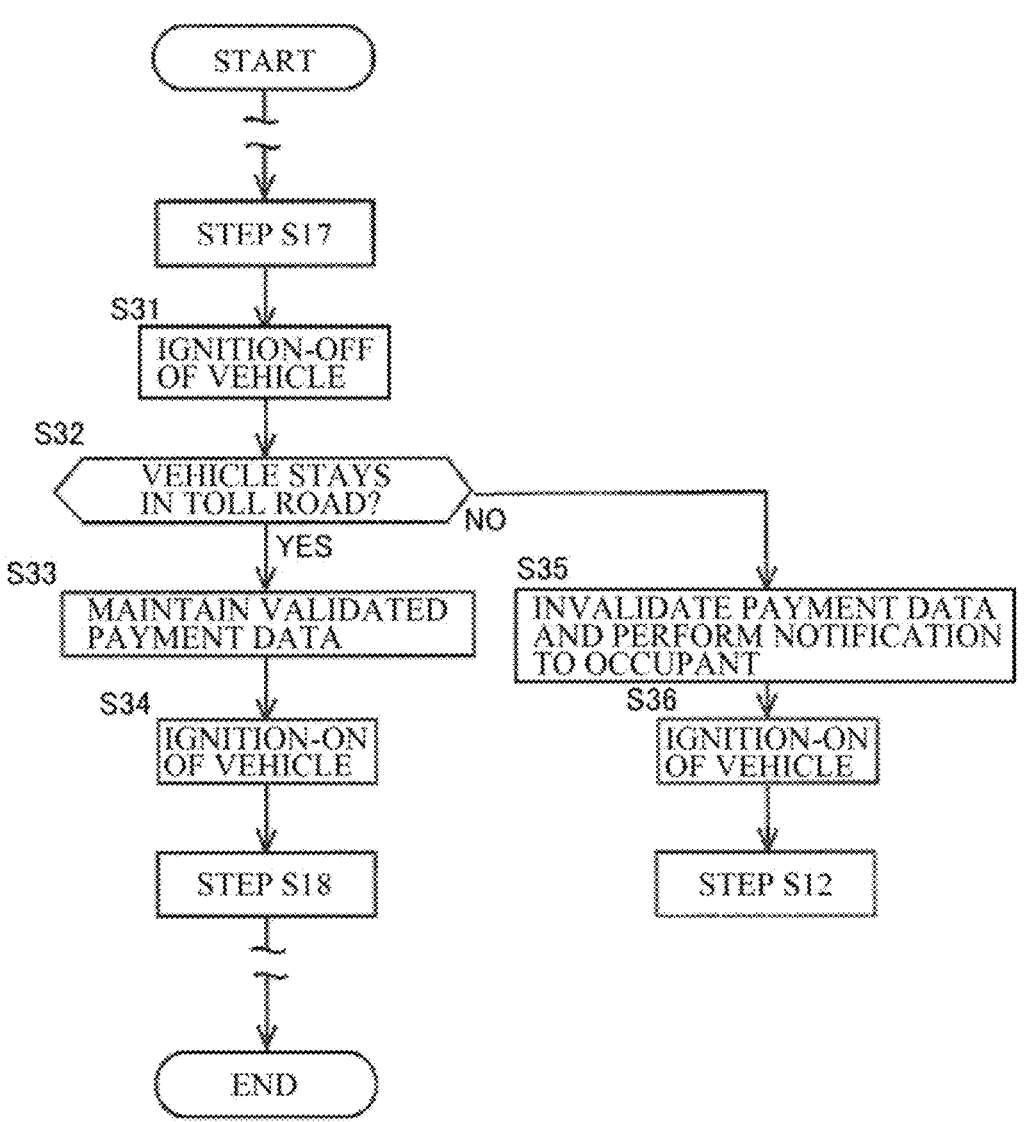
FIG. 3 is a flowchart illustrating a method of controlling the cashless payment to be performed by the toll payment apparatus for the vehicle illustrated in FIG. 1.

FIG. 1 is a block diagram illustrating the toll payment apparatus 10 according to the example embodiment of the disclosure. FIG. 2 is a flowchart illustrating a control method to be performed at a toll road by the toll payment apparatus 10 illustrated in FIG. 1. FIG. 3 is a flowchart illustrating a modification example of the control method to be performed at the toll road by the toll payment apparatus 10 illustrated in FIG. 1.

Referring to FIG. 1, the toll payment apparatus 10 according to the example embodiment may perform a communication between an ETC in-vehicle device 16 mounted on the vehicle and roadside devices at respective entrance and exit gates of a toll road, and enable a cashless payment without stopping the vehicle. It should be noted that the toll payment apparatus 10 is not limited to the cashless payment for the toll road.

For example, a new cashless payment service has been provided in recent years that uses the ETC in-vehicle device 16 and is called ETCX operated by ETC Solutions, Inc., located in Tokyo, Japan. As with the payment service of the toll road, the ETCX performs a communication between the ETC in-vehicle device 16 mounted on the vehicle and the roadside device provided at the gate, and allows a payment of charges of a facility such as a drive-through, a parking lot, a gas station, an EV station, a waste treatment facility, or a ferry to be based on a cashless payment.

The toll payment apparatus 10 includes a vehicle processor 11, a synchronizer 12, and an occupant data obtainer 13. The synchronizer 12 may synchronize with a communicator 15 of an occupant. The occupant data obtainer 13 may acquire, for example, biological data of the occupant. The toll payment apparatus 10 may include a navigator 14. For example, the communicator 15 may be any device that has a wireless communication functionality and has a cashless payment functionality. The communicator 15 may be a mobile terminal such as a smartphone, a mobile phone, or a personal digital assistant (PDA).

The vehicle processor 11 may have devices including, for example, a central processing unit (CPU), a read-only memory (ROM), and a random-access memory (RAM). The vehicle processor 11 may be an electronic control unit (ECU) that includes one or more processors and executes various calculations adapted to control devices including, for example, the toll payment apparatus 10 and an unillustrated driving device such as an engine.

The vehicle processor 11 may include an unillustrated storage. For example, the storage may be a nonvolatile memory such as an electrically erasable programmable read-only memory (EEPROM). The storage may hold various pieces of data necessary for controlling the vehicle and one or more programs executable by the one or more processors.

The synchronizer 12 may be coupled to the communicator 15 of the occupant and store data held in the communicator 15 in the storage of the vehicle processor 11. For example, under a control of the vehicle processor 11, the synchronizer 12 may be coupled to the communicator 15 of the occupant and store payment data and identification data held in the communicator 15 in the storage of the vehicle processor 11. A short-range wireless communication may be used for the communication between the synchronizer 12 and the communicator 15, for example.

The payment data may include, for example, payment data related to a payment application held in the communicator 15. The identification data may include data adapted to unlock a locked state of the communicator 15. The data adapted to unlock the locked state of the communicator 15 may include biological data such as face authentication data, fingerprint authentication data, vein authentication data, or iris authentication data. Alternatively or in addition, the data adapted to unlock the locked state of the communicator 15 may include data such as passcode authentication data, pattern code authentication data, or gesture authentication data.

The occupant data obtainer 13 may be disposed in a vehicle compartment of the vehicle, and acquire occupant data necessary to compare the occupant data with the identification data. In some embodiments where the identification data is the biological authentication data of the occupant, the occupant data obtainer 13 may be an imaging device disposed in the vehicle compartment of the vehicle. For example, the imaging device may be a camera module including an image sensor such as a charge coupled device (CCD) or a complementary metal-oxide-semiconductor (CMOS). The imaging device may be coupled to the vehicle processor 11 via an in-vehicle network such as a controller area network (CAN) or a local interconnect network (LIN). The occupant data obtainer 13 may acquire the occupant data such as the face data, the fingerprint data, the vein data, or the iris data of the occupant by capturing an image of the occupant by the imaging device, and transmit the acquired occupant data to the vehicle processor 11. The thus-acquired occupant data may be stored in the storage of the vehicle processor 11.

In recent years, vehicles have been equipped with a driver monitoring system (hereinafter referred to as "DMS") that recognizes a driver's face and provides an alarm for inattentive driving of the driver or an alarm when the driver involves drowsiness or is asleep. For example, an imaging device used in the DMS may be disposed on an inner side of a steering wheel, and capture an image of a face of the driver. Accordingly, in some embodiments, the occupant data obtainer 13 may be the imaging device used for the DMS.

In some embodiments where the identification data is the passcode authentication data or the pattern code authentication data, the occupant data obtainer 13 may be a device, such as a touch panel display, disposed on an instrument panel, for example. The occupant may input a passcode or a pattern code using the touch panel display. Thus, the occupant data obtainer 13 may acquire the occupant data, and transmit the acquired occupant data to the vehicle processor 11. The occupant data may be stored in the storage of the vehicle processor 11.

The navigator 14 may acquire, through an unillustrated vehicle communicator, map data indicating, for example, a map, traffic congestion, and traffic restriction. The navigator 14 may determine a scheduled travel route indicating a route along which the vehicle is scheduled to travel, based on a departure point, a destination, and the map data. The navigator 14 may acquire a current location of the vehicle by GPS. In the example embodiment, as described later in greater detail, the vehicle processor 11 may determine whether to maintain the payment data or to invalidate the payment data, based on position data of the vehicle acquired from the navigator 14.

The ETC in-vehicle device 16 may be disposed in the vehicle. The ETC in-vehicle device 16 may perform a communication with the roadside devices at the respective entrance and exit gates of, for example, the toll road, and transmit, to the roadside devices, vehicle data and ETC data that includes the payment data of the occupant. The ETC in-vehicle device 16 may be coupled to the vehicle processor 11 via the in-vehicle network, and acquire, from the vehicle, the ETC data including the payment data of the occupant.

Next, a method of controlling a cashless payment to be performed by the toll payment apparatus 10 according to the example embodiment will be described with reference to FIG. 2. In the example embodiment, an example will be described in which the driver is the occupant of the vehicle, but any embodiment of the disclosure is not limited to the driver, as long as the occupant is an owner of the communicator 15.

Referring to FIG. 2, in step S10, the vehicle may be placed in an ignition-on state when the driver rides on the vehicle and presses an unillustrated ignition switch. In step S11, the toll payment apparatus 10 mounted on the vehicle may also be turned on when the ignition switch is pressed. Note that a start up of the vehicle in any embodiment of the disclosure may refer to a time when the vehicle is placed in the ignition-on state in response to the pressing of the ignition switch.

In step S12, the vehicle processor 11 may control an unillustrated communicator of the vehicle, and start a connection to the communicator 15 of the driver. If the communication to the communicator 15 is successful (YES in step S12), the process may proceed to step S13. If it is not possible for the communicator of the vehicle to perform the connection to the communicator 15, the communicator of the of the vehicle may continue executing the connection to the communicator 15 for a predetermined period of time.

In step S13, the vehicle processor 11 may control the synchronizer 12, and the synchronizer 12 may start a synchronization operation of the payment data and the identification data held in the communicator 15. If the communicator 15 stores the payment data and the identification data (YES in step S13), the synchronizer 12 may acquire the payment data and the identification data from the communicator 15. The vehicle processor 11 may store the payment data and the identification data acquired from the communicator 15 in the storage.

If the communicator 15 does not store the payment data and the identification data (NO in step S13), it is not possible to use the cashless payment using the toll payment apparatus 10 and the process may end.

For example, in the toll payment apparatus 10, it is necessary for the driver to download a payment application and set a cashless payment system in advance for the communicator 15. Similarly, in the toll payment apparatus 10, it is necessary for the driver to set in advance, for the communicator 15, the identification data adapted to unlock the locked state of the communicator 15. Accordingly, it is not possible to use the cashless payment using the toll payment apparatus 10 in NO of step S13 when the driver does not set at least the payment data or the identification data for the communicator 15.

In step S14, the vehicle processor 11 may control the occupant data obtainer 13 and acquire the occupant data of the driver of the vehicle. In some embodiments, the occupant data obtainer 13 may be the DMS imaging device as described above. In some embodiments where the occupant data obtainer 13 is the DMS imaging device, the occupant data obtainer 13 may acquire the occupant data such as the face data, the vein data, or the iris data of the driver by capturing the image of the face of the driver, and transmit the acquired occupant data to the vehicle processor 11. The vehicle processor 11 may store the occupant data in the storage.

In step S15, the vehicle processor 11 may determine whether the identification data and the occupant data match with each other by performing a compassion between the identification data and the occupant data held in the storage. In some embodiments where the identification data is the face authentication data, the vehicle processor 11 may perform the comparison based on the face data acquired by the occupant data obtainer 13. In some embodiments where three pieces of data, i.e., the face authentication data, the vein authentication data, and the iris authentication data, are acquired as the identification data, the vehicle processor 11 may perform the determination based on the face data, the vein data, and the iris data of the occupant acquired by the occupant data obtainer 13. Increasing the number of data to be used for the determination by the vehicle processor 11 helps to increase an accuracy of the determination and allows for an easier prevention of an illicit use of the payment data.

If the vehicle processor 11 determines that the identification data and the occupant data match with each other (YES in step S15), the process may proceed to step S16. In step S16, the vehicle processor 11 may validate the payment data held in the storage, and transmit the validated payment data to the ETC in-vehicle device 16. The ETC in-vehicle device 16 may store the payment data as one of the ETC data. The vehicle processor 11 may control the navigator 14 and notify the driver that the payment data has been validated, by using, for example, a voice of the navigator 14.

In step S17, the driver may recognize that the payment data is validated and drive the vehicle toward an entrance gate at an interchange of the toll road in order to enter the toll road from a general road. When the vehicle approaches the entrance gate, the ETC in-vehicle device 16 may communicate with the roadside device installed at the entrance gate, and transmit the ETC data and the vehicle data to the roadside device. The vehicle may then passe through the open entrance gate and start traveling on the toll road.

In step S18, the driver may drive the vehicle toward an exit gate at an interchange of the toll road to return from the toll road to a general road and travel toward the desired destination. When the vehicle approaches the exit gate, the ETC in-vehicle device 16 may communicate with the roadside device installed at the exit gate, and transmit the ETC data and the vehicle data to the roadside device. The vehicle may then passe through the open exit gate and start traveling on the general road.

In step S19, the vehicle processor 11 may validate the payment data, and the roadside devices of the toll road may perform a payment process based on the validated payment data in response to the normal communication performed by the vehicle with the entrance and the exit gates of the toll road.

In step S20, the driver may arrive at the destination and stop the vehicle in a parking lot, for example. The vehicle may be placed in an ignition-off state when the driver presses the ignition switch. It should be noted that deactivation of the vehicle in any embodiment of the disclosure may refer to a time when the vehicle is placed in the ignition-off state in response to the pressing of the ignition switch.

In step S21, the vehicle processor 11 may determine that the vehicle is in the ignition-off state, and delete the payment data and the identification data held in the storage to invalidate the payment data. The toll payment apparatus 10 may be turned off. The vehicle processor 11 may control the navigator 14 and notify the driver that the payment data is invalidated by using, for example, the voice of the navigator 14. The vehicle processor 11 may transmit, to the ETC in-vehicle device 16, a signal indicating that the payment data is invalidated. The payment data of the ETC in-vehicle device 16 may also be deleted.

If the vehicle processor 11 determine that the identification data and the occupant data do not match with each other (NO in step S15), the vehicle processor 11 may proceed to step S20 without validating the payment data held in the storage. In other words, in the toll payment apparatus 10 according to the example embodiment, it is not possible to use the cashless payment when the identification data and the occupant data do not match with each other.

In the toll payment apparatus 10 according to the example embodiment, the vehicle processor 11 may control the occupant data obtainer 13 and acquire the occupant data such as the face data, the vein data, or the iris data of the driver. The vehicle processor 11 may perform the comparison between the identification data acquired from the communicator 15 of the driver and the occupant data, and determine whether the identification data and the occupant data match with each other. When the vehicle processor 11 determines that the identification data and the occupant data do not match with each other by the control method described above, the vehicle processor 11 may not validate the payment data linked to the identification data. This configuration helps to prevent the illicit cashless payment that uses the payment data of another person, when, for example, the driver brings the communicator 15 of the other person into the vehicle without permission.

The toll payment apparatus 10 according to the example embodiment eliminates the necessity of the ETC card, which in turn eliminates the driver's necessity to insert or remove the ETC card into or from the ETC in-vehicle device 16 every time the toll road is used. Thus, it is possible to save the driver's time and effort to handle the ETC card, and prevent the driver from forgetting to insert or remove the ETC card into or from the ETC in-vehicle device 16. It is also possible to prevent the ETC card, which has been forgotten to be removed by the driver, to be illicitly used by the other person even in a system, such as car-sharing, in which a single vehicle is used by an unspecified number of persons.

Next, as a modification example of the control method described with reference to FIG. 2, a method of controlling a cashless payment on a toll road using the toll payment apparatus 10 according to the example embodiment will be described with reference to FIG. 3. It should be noted that the method of controlling the toll payment apparatus 10 illustrated in FIG. 3 differs from the control method illustrated in FIG. 2 in processes to be performed between step S17 and step S18 and the processes different therefrom will be described here in greater detail.

Referring to FIG. 3, in step S31, the vehicle may be placed in the ignition-off state, when the driver stops the vehicle at, for example, a parking lot in a rest area and presses the ignition switch.

In step S32, the vehicle processor 11 may control the navigator 14 and acquire the position data of the vehicle from the navigator 14. The vehicle processor 11 may determine whether the vehicle stays in the toll road.

If the vehicle processor 11 determines that the vehicle stays in the toll road (YES in step S32), the process may proceed to step S33. In step S33, the vehicle processor 11 may maintain the validated payment data.

In step S34, the vehicle may be placed in the ignition-on state, when the driver rides on the vehicle again and presses the ignition switch. The toll payment apparatus 10 mounted on the vehicle may also be turned on when the ignition switch is pressed.

The driver may resume traveling of the vehicle on the toll road. The driver may travel the vehicle toward the exit gate at the interchange of the toll road when returning from the toll road to the general road. Thereafter, a control method similar to the control method on and after step S18 may be performed.

If the vehicle processor 11 determines that the vehicle does not stay in the toll road (NO in step S32), the process may proceed to step S35.

In step S35, the vehicle processor 11 may delete the payment data and the identification data held in the storage to invalidate the payment data. The toll payment apparatus 10 may be turned off. The vehicle processor 11 may control the navigator 14 and notify the driver that the payment data is invalidated. The vehicle processor 11 may transmit, to the ETC in-vehicle device 16, a signal indicating that the payment data is invalidated. The payment data of the ETC in-vehicle device 16 may also be deleted.

In step S36, the vehicle may be placed in the ignition-on state when the driver rides on the vehicle again and presses the ignition switch. The toll payment apparatus 10 mounted on the vehicle may also be turned on when the ignition switch is pressed.

Because the payment data and the identification data held in the storage are invalidated in step S35 as described above, the process may return to step S12, and the vehicle processor 11 may control the communicator of the vehicle and start the connection to the communicator 15 of the occupant. Thereafter, a control method similar to the control method on and after step S12 may be performed.

The driver may sometimes stop the vehicle at, for example, the parking lot in the rest area for a break such as a meal. In this case, the driver gets off the vehicle and the vehicle is placed in the ignition-off state; however, the payment data and the identification data held in the storage are maintained. This control method maintains data on the communication between the ETC in-vehicle device 16 and the roadside device performed at the entrance gate, and allows an appropriate payment process to be performed at the exit gate when the vehicle is restarted and returns from the toll road to the general road.

The payment data and the identification data held in the storage are invalidated when the vehicle is restarted at a place other than the toll road for some reason such as a vehicle malfunction. Thus, the toll payment apparatus 10 is resumed from a new state. In addition, the payment data and the identification data are prevented from being unnecessarily remained in the storage of the vehicle processor 11. Accordingly, this configuration helps to prevent the illicit use of the payment data.

In the toll payment apparatus 10 according to the example embodiment, the cashless payment may be performed by the ETC in-vehicle device 16 that performs the communication with the roadside devices installed at the respective entrance and exit gates at the interchanges of the toll road when the vehicle travels on the toll road, although it is not limited thereto. The toll payment apparatus 10 according to any embodiment of the disclosure makes it possible to achieve effects similar to the example effects of the toll payment apparatus 10 according to the example embodiment described above when the toll payment apparatus 10 is employed for a facility that uses the ETC in-vehicle device 16, such as the drive-through, the parking lot, the gas station, the EV station, the waste treatment facility, or the ferry.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

In the vehicle toll payment apparatus according to at least one embodiment of the disclosure, the payment data and the identification data held in the communicator of the occupant of the vehicle are stored in the storage of the vehicle processor via the synchronizer of the vehicle. The occupant data of the occupant is stored in the storage of the vehicle processor via the occupant data obtainer of the vehicle. The vehicle processor determines the validation of the payment data linked to the identification data, based on the identification data and the occupant data. This control method helps to prevent the illicit use of the payment data, and eliminate the operation of inserting and removing the ETC card to be performed by the occupant.

The vehicle processor 11 and the synchronizer 12 illustrated in FIG. 1 are each implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of any of the vehicle processor 11 and the synchronizer 12. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform. all or a part of the functions of any of the vehicle processor 11 and the synchronizer 12 illustrated in FIG. 1.

The invention claimed is:

1. A toll payment apparatus for a vehicle, the toll payment apparatus comprising:
    a synchronizer configured to be mounted on the vehicle and configured to:
        communicatively couple to a communicator of an occupant of the vehicle to synchronize with the communicator;

acquire, from the communicator of the occupant, payment data and identification data of an owner of the communicator, the identification data including face authentication data configured to unlock a locked state of the communicator;
        store the payment data and the identification data acquired from the communicator in a storage of the vehicle;
    an occupant data obtainer configured to be mounted on the vehicle, the occupant data obtainer comprising a driver monitoring system (DMS) imaging device disposed in a vehicle compartment of the vehicle and configured to:
        capture an image of a face of the occupant present in the vehicle;
        acquire occupant data comprising face data of the occupant from the captured image,
        store the face data in the storage of the vehicle;
        communicatively coupled to a vehicle processor to transmit the acquired occupant data to the vehicle processor;
    an electronic toll collection (ETC) in-vehicle device mounted on the vehicle and configured to communicatively couple to a roadside device to execute a payment of a facility associated with the roadside device; and
    a navigator configured to acquire position data of the vehicle;
    the vehicle processor mounted on the vehicle and configured to:
        determine whether the vehicle is in an ignition-on state;
        in response to the vehicle being in the ignition-on state, perform a comparison between the face authentication data included in the identification data and the face data included in the occupant data to determine whether the face authentication data and the face data match with each other,
        in response to the face authentication data and the face data matching with each other, determine that the owner of the communicator identified by the payment data acquired from the communicator is the occupant present in the vehicle,
        in response to determining the owner identified by the payment data is the occupant present in the vehicle, validate a payment that is based on the payment data,
        transmit the validated payment data to the ETC in-vehicle device, the validated payment data being transmitted by the ETC in-vehicle device to the roadside device to execute the payment of the facility;
        determine whether the vehicle is in an ignition-off state;
        in response to the vehicle being in the ignition-off state, acquire the position data of the vehicle from the navigator;
        determine whether the vehicle stays in a toll road based on the acquired position data of the vehicle from the navigator;
        in response to determining that the vehicle stays in the toll road, maintain the validated payment data; and
        in response to determining that the vehicle does not stay in the toll road, (i) delete the payment data and the identification data stored in the storage of the vehicle to invalidate the payment data and the identification data, (ii) notify a driver of the vehicle that the payment data and the identification data invalidated, and (iii) transmit a signal indicating that the payment data is invalidated to the ETC in-vehicle device, and cause the ETC in-vehicle device to delete the validated payment data stored in the ETC in-vehicle device.

2. A toll payment apparatus for a vehicle, the toll payment apparatus comprising:

circuitry configured to be mounted on the vehicle;

an occupant data obtainer comprising a driver monitoring system (DMS) imaging device disposed in a vehicle compartment of the vehicle and configured to capture an image of a face of an occupant present in the vehicle;

a navigator configured to acquire position data of the vehicle; and an electronic toll collection (ETC) in-vehicle device to be mounted on the vehicle, wherein the circuitry is configured to:

communicatively couple to a communicator of the occupant of the vehicle to synchronize with the communicator;

acquire, from the communicator of the occupant, payment data and identification data of an owner of the communicator, the identification data including face authentication data configured to unlock a locked state of the communicator;

store the payment data and the identification data acquired from the communicator in a storage of the vehicle;

cause the occupant data obtainer to capture an image of a face of the occupant present in the vehicle;

acquire occupant data comprising face data of the occupant from the occupant present in the vehicle and to transmit the acquired occupant data to the circuitry captured image;

store the face data in the storage of the vehicle;

determine whether the vehicle is in an ignition-on state;

in response to the vehicle being in the ignition-on state, perform a comparison between the face authentication data included in the identification data and the face data included in the occupant data to determine whether the face authentication data and the face data match with each other, in response to the face authentication data and the face data matching with each other, determine that the owner identified by the payment data acquired from the communicator is the occupant present in the vehicle, in response to determining the owner identified by the payment data is the occupant present in the vehicle, validate a payment that is based on the payment data, transmit the validated payment data to the ETC in-vehicle device, the ETC in-vehicle device being configured to communicatively couple to a roadside device to execute a payment of a facility associated with the roadside device, the validated payment data being transmitted by the ETC in-vehicle device to the roadside device to execute the payment of the facility;

determine whether the vehicle is in an ignition-off state;

in response to the vehicle being in the ignition-off state, acquire the position data of the vehicle from the navigator;

determine whether the vehicle stays in a toll road based on the acquired position data of the vehicle from the navigator;

in response to determining that the vehicle stays in the toll road, maintain the validated payment data; and in response to determining that the vehicle does not stay in the toll road, (i) delete the payment data and the identification data stored in the storage of the vehicle to invalidate the payment data and the identification data, (ii) notify a driver of the vehicle that the payment data and the identification data are invalidated, and (iii) transmit a signal indicating that the payment data is invalidated to the ETC in-vehicle device, and cause the ETC in-vehicle device to delete the validated payment data stored in the ETC in-vehicle device.

3. A vehicle comprising:

an electronic toll collection (ETC) in-vehicle device;

a camera disposed in a vehicle compartment of the vehicle and configured to capture an image of a face of a driver present in the vehicle;

a navigator configured to acquire position data of the vehicle; and circuitry configured to:

communicatively couple to a communicator of an occupant of the vehicle to synchronize with the communicator;

acquire, from the communicator of the occupant, payment data and identification data of an owner of the communicator, the identification data including face authentication data configured to unlock a locked state of the communicator;

store the payment data and the identification data acquired from the communicator in a storage of the vehicle;

acquire face data of the driver present in the vehicle from the captured image;

store the face data in the storage of the vehicle;

determine whether the vehicle is in an ignition-on state;

in response to the vehicle being in the ignition-on state, perform a comparison between the face authentication data included in the identification data and the face data to determine whether the face authentication data and the face data match with each other;

in response to the face authentication data and the face data matching with each other, determine that the owner identified by the payment data acquired from the communicator is the driver present in the vehicle;

in response to determining the owner identified by the payment data is the driver present in the vehicle, validate a payment that is based on the payment data;

transmit the validated payment data to the ETC in-vehicle device, the ETC in-vehicle device being configured to communicatively couple to a roadside device to execute a payment of a facility associated with the roadside device, the validated payment data being transmitted by the ETC in-vehicle device to the roadside device to execute the payment of the facility;

determine whether the vehicle is in an ignition-off state;

in response to the vehicle being in the ignition-off state, acquire the position data of the vehicle from the navigator;

determine whether the vehicle stays in a toll road based on the acquired position data of the vehicle from the navigator;

in response to determining that the vehicle stays in the toll road, maintain the validated payment data; and in response to determining that the vehicle does not stay in the toll road, (i) delete the payment data and the identification data stored in the storage of the vehicle to invalidate the payment data and the identification data, (ii) notify a driver of the vehicle that the payment data and the identification data are invalidated, and (iii) transmit a signal indicating that the payment data is invalidated to the ETC in-vehicle device, and cause the ETC in-vehicle device to delete the validated payment data stored in the ETC in-vehicle device.

* * * * *